US012418703B2

(12) United States Patent
Park et al.

(10) Patent No.: US 12,418,703 B2
(45) Date of Patent: Sep. 16, 2025

(54) METHOD FOR PROVIDING PRODUCT INFORMATION ON CONTENT, AND SERVER EXECUTING SAME

(71) Applicants: Sang Jun Park, Yongin-si (KR); AMBRO MATERIALS INC., Yongin-si (KR)

(72) Inventors: Sang Jun Park, Yongin-si (KR); Seung Woo Lee, Namyangju-si (KR)

(73) Assignees: Sang Jun PARK, Yongin-si (KR); AMBRO MATERIALS INC., Seoul (KR)

( * ) Notice: Subject to any disclaimer, the term of this patent is extended or adjusted under 35 U.S.C. 154(b) by 150 days.

(21) Appl. No.: 18/270,406

(22) PCT Filed: Dec. 9, 2021

(86) PCT No.: PCT/KR2021/018577
§ 371 (c)(1),
(2) Date: Jun. 29, 2023

(87) PCT Pub. No.: WO2022/145789
PCT Pub. Date: Jul. 7, 2022

(65) Prior Publication Data
US 2024/0064377 A1 Feb. 22, 2024

(30) Foreign Application Priority Data
Dec. 30, 2020 (KR) .................. 10-2020-0187630

(51) Int. Cl.
*H04N 21/4722* (2011.01)
*H04N 21/254* (2011.01)
(Continued)

(52) U.S. Cl.
CPC ..... *H04N 21/4722* (2013.01); *H04N 21/2542* (2013.01); *H04N 21/47815* (2013.01); *H04N 21/4884* (2013.01)

(58) Field of Classification Search
CPC .......... H04N 21/4722; H04N 21/2542; H04N 21/47815; H04N 21/4884; H04N 21/254;
(Continued)

(56) References Cited

U.S. PATENT DOCUMENTS

2004/0193501 A1* 9/2004 Allen .................. G06Q 30/08
705/26.2
2012/0167146 A1* 6/2012 Incorvia ......... H04N 21/234318
725/60
(Continued)

FOREIGN PATENT DOCUMENTS

| KR | 10-2015-0055794 A | 5/2015 |
| KR | 10-2017-0094647 A | 8/2017 |
| KR | 10-2018-0010554 A | 1/2018 |

OTHER PUBLICATIONS

International Search Report for PCT/KR2021/018577 dated Mar. 8, 2022 (PCT/ISA/210).

*Primary Examiner* — Adil Ocak
(74) *Attorney, Agent, or Firm* — Sughrue Mion, PLLC

(57) ABSTRACT

A method for providing product information on content includes the steps of: after providing content to a content user terminal, receiving a product search request message from the content user terminal; extracting, from the product search request message, content information, location information and time information; extracting time information corresponding to scene-specific spatial subtitles on the basis of a subtitle file for the content; extracting, from among spatial subtitles of a scene corresponding to time information, sales information regarding a broadcast derivative product, and providing the extracted sales information to the
(Continued)

content user terminal; if purchase of the broadcast derivative product is completed via the sales information, extracting, from a pre-built spatial subtitle creator database, a spatial subtitle creator that has registered the spatial subtitles of the scene; and paying some of a sales amount of the broadcast derivative product to an account of the spatial subtitle creator.

2 Claims, 6 Drawing Sheets

(51) Int. Cl.
*H04N 21/478* (2011.01)
*H04N 21/488* (2011.01)

(58) Field of Classification Search
CPC ............. H04N 21/478; H04N 21/4784; H04N 21/488; H04N 21/812
USPC .......................................................... 725/60
See application file for complete search history.

(56) References Cited

U.S. PATENT DOCUMENTS

| | | | |
|---|---|---|---|
| 2014/0074664 A1 | 3/2014 | Amsalem | |
| 2017/0155966 A1* | 6/2017 | Oh | ..................... H04N 21/4884 |
| 2019/0340672 A1 | 11/2019 | Bilir et al. | |
| 2021/0240756 A1* | 8/2021 | Taboriskiy | .............. G06F 16/48 |

* cited by examiner

METHOD FOR PROVIDING PRODUCT INFORMATION ON CONTENT, AND SERVER EXECUTING SAME

CROSS REFERENCE TO RELATED APPLICATIONS

This application is a National Stage of International Application No. PCT/KR2021/018577 filed Dec. 9, 2021, claiming priority based on Korean Patent Application No. 10-2020-0187630 filed Dec. 30, 2020.

TECHNICAL FIELD

The present disclosure relates to a method of providing information on a product in content and a server for performing the same, and more specifically, to a method of providing information on a product in content which enables a user to acquire sales information of a broadcast derivative product by simply touching the broadcast derivative product in a specific scene in the user's process of using content, and a server for performing the same.

BACKGROUND ART

Today, the rapid development of the computer-related information and communication field is not only dramatically increasing work efficiency but also significantly changing our daily lifestyle. For example, as a form of shopping related to product purchase, product purchase through online shopping malls on computers is gradually increasing.

In general, in order for a consumer to purchase a product from an online shopping mall, he or she needs to use a terminal, such as a computer or a mobile communication terminal, to access the online shopping mall in which he or she wants to purchase the product. Here, a method of accessing a homepage of an online shopping mall using the Internet is frequently used.

When a consumer connects to an online shopping mall through a terminal, the online shopping mall shows products thereof on the consumer's terminal, and the consumer searches for a necessary product while checking details, such as product functions, prices, sales conditions, etc., from a database built in the online shopping mall.

Also, in a shopping-mall-comparing online shopping mall which provides information on several shopping malls, prices of a product set by sellers selling the product selected by a consumer are compared, and a seller having the lowest price is provided.

As product search methods, a directory-based product search method of searching for a desired product through three stages of classification, major, medium, and minor, and a product search method using a search word are generally provided. Also, products are introduced through banner advertisements and recommended product lists. Through such a product search, a consumer selects a desired product.

When a consumer selects a product to be purchased through such a product search, the process generally proceeds to a purchase product ordering step, and the purchase product is ordered through confirmation of a payment method.

The consumer may purchase the product by expressing his or her intention to purchase through selection of a payment method for the selected product, and the payment is made through bank transfer, a credit card, electronic currency, etc.

Meanwhile, consumers access an information providing server through a network, such as the Internet, to acquire necessary information, and in many cases, try to purchase products related to the acquired information. However, in this case, the information providing server does not provide product information related to the corresponding information.

Therefore, to acquire product information related to the corresponding information or purchase a product, consumers should access an online shopping mall in which the product is on sale and search for information on the product, which is inconvenient.

DISCLOSURE

Technical Problem

The present disclosure is directed to providing a method of providing information on a product in content which enables a user to acquire sales information of a broadcast derivative product by simply touching the broadcast derivative product in a specific scene in the user's process of using content, and a server for performing the same.

The present disclosure is also directed to providing a method of providing information on a product in content in which a spatial subtitle creator generates spatial subtitles for scenes of content so that the spatial subtitle creator may receive some of sales proceeds as a commission when purchase of a broadcast derivative product is completed through a spatial subtitle for a scene of the content, and a server for performing the same.

Technical problems to be solved by the present disclosure are not limited to those described above. Other technical problems and advantages of the present disclosure which have not been described will be understood from the following description and more clearly understood through embodiments of the present disclosure. Also, it will be readily seen that the technical problems and advantages of the present disclosure may be achieved by means described in the claims and combinations thereof.

Technical Solution

One aspect of the present disclosure provides a method of providing information on a product in content which is performed by a server for providing information on a product in content, the method including providing content to a content user terminal and then receiving a product search request message from the content user terminal, extracting content information and location information and time information of a broadcast derivative product from the product search request message, extracting a spatial subtitle of a scene corresponding to the time information from a pre-built spatial subtitle database, extracting time information corresponding to scene-specific spatial subtitles on the basis of a subtitle file for the content, extracting sales information of a broadcast derivative product corresponding to the location information of the broadcast derivative product to be searched for in the spatial subtitle of the scene corresponding to the time information and providing the extracted sales information to the content user terminal, when purchase of the broadcast derivative product is completed through the sales information of the broadcast derivative product, extracting a spatial subtitle creator who has registered the spatial subtitle of the scene from a pre-built spatial subtitle creator database, and paying some of a sales amount of the broadcast derivative product to an account of the spatial subtitle creator.

Another aspect of the present disclosure provides a server for providing information on a product in content, the server including a spatial subtitle database management unit configured to generate, when scene-specific spatial subtitles for content are received from a spatial subtitle creator terminal, a spatial subtitle database by mapping the spatial subtitles to time information acquired by analyzing the scene-specific spatial subtitles for the content and storing the spatial subtitles and the time information, a spatial subtitle creator database management unit configured to receive the scene-specific spatial subtitles for the content from the spatial subtitle creator terminal and generate a spatial subtitle creator database by mapping spatial subtitle creator information and sales information of broadcast derivative products acquired by analyzing the scene-specific spatial subtitles for the content and storing the spatial subtitle creator information and the sales information, and a product information provision management unit configured to provide the content to a content user terminal, receive a product search request message from the content user terminal, extract content information and location information and time information of a broadcast derivative product from the product search request message, extract a spatial subtitle of a scene corresponding to the time information from the pre-built spatial subtitle database, extract time information corresponding to the scene-specific spatial subtitles on the basis of a subtitle file for the content, extract sales information of a broadcast derivative product corresponding to the location information of the broadcast derivative product to be searched for in the spatial subtitle of the scene corresponding to the time information and provide the extracted sales information to the content user terminal, extract a spatial subtitle creator who has registered the spatial subtitle of the scene from the pre-built spatial subtitle creator database when purchase of the broadcast derivative product is completed through the sales information of the broadcast derivative product, and pay some of a sales amount of the broadcast derivative product to an account of the spatial subtitle creator.

Advantageous Effects

According to the above-described present disclosure, it is possible to acquire sales information of a broadcast derivative product by a user simply touching the broadcast derivative product in a specific scene during a process of using content.

According to the present disclosure, a spatial subtitle creator generates spatial subtitles for scenes of content so that the spatial subtitle creator can receive some of sales proceeds as a commission when purchase of a broadcast derivative product through a spatial subtitle for a scene of the content is completed by a content user.

MODES OF THE INVENTION

Figure 1:
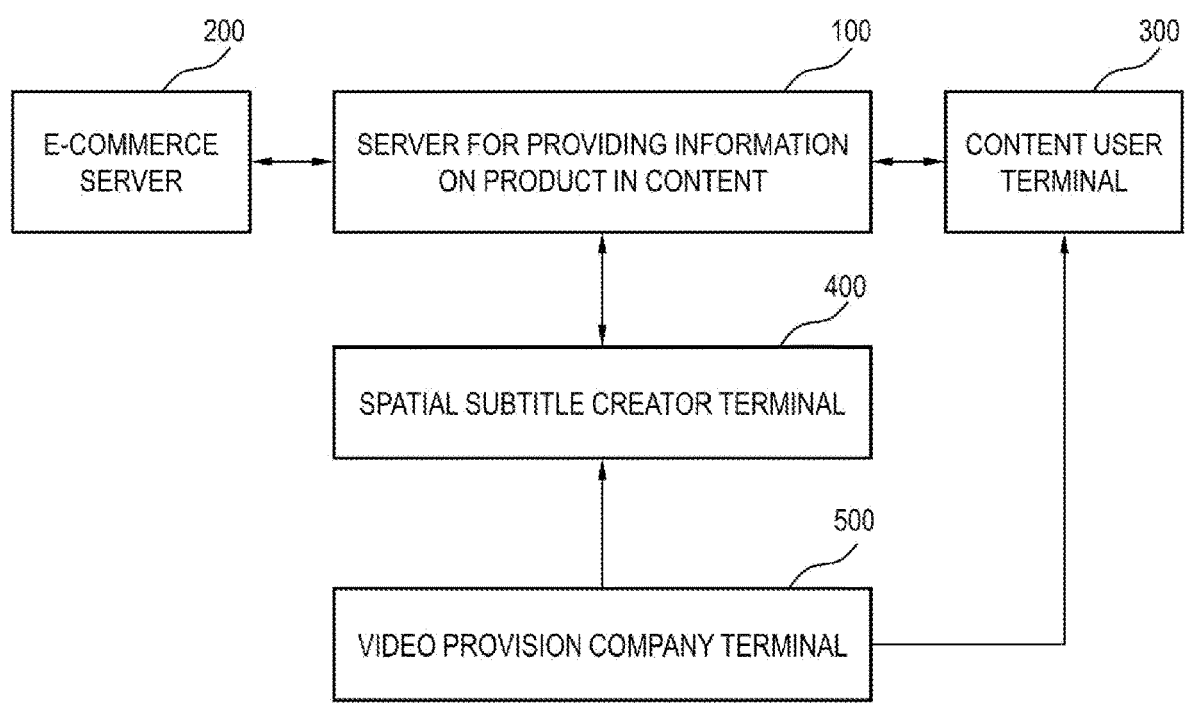
FIG. 1 is a network configuration diagram illustrating a system for providing information on a product in content according to an embodiment of the present disclosure.

The foregoing technical problems, features, and advantages will be described in detail below with reference to the accompanying drawings. Accordingly, those skilled in the technical field to which the present disclosure pertains may readily implement the technical spirit of the present disclosure. In describing the present disclosure, when the detailed description of a well-known technology related to the present disclosure is determined to unnecessarily obscure the subject matter of the present disclosure, the detailed description will be omitted. Hereinafter, exemplary embodiments of the present disclosure will be described in detail with reference to the accompanying drawings. Throughout the drawings, like reference numerals refer to like components.

Among terms used herein, the term "broadcast derivative product" means any type of product exposed through content. For example, in the case of television (TV), broadcast derivative products correspond to accessories and clothes worn by actors and actresses, items around the actors and actresses, etc.

FIG. 1 is a network configuration diagram illustrating a system for providing information on a product in content according to an embodiment of the present disclosure.

Referring to FIG. 1, the system for providing information on a product in content includes a server 100 for providing information on a product in content, an e-commerce server 200, a content user terminal 300, a spatial subtitle creator terminal 400, and a video provision company terminal 500.

The server 100 for providing information on a product in content receives a product search request message including content information and location information and time information of a broadcast derivative product from the content user terminal 300.

Subsequently, the server 100 for providing information on a product in content extracts sales information of the corresponding product according to the product search request message and provides the extracted sales information to the content user terminal 300.

To this end, the server 100 for providing information on a product in content extracts the content information and the location information and the time information of the broadcast derivative product from the product search request message.

Subsequently, the server 100 for providing information on a product in content extracts a spatial subtitle of a scene corresponding to the time information from a spatial subtitle database. Here, scene-specific spatial subtitles are information indicating product information of each broadcast derivative product (e.g., a chair, a bed, a piece of clothing, shoes, etc.) shown in scenes.

As described above, to extract a spatial subtitle of a scene corresponding to time information, the server 100 for providing information on a product in content generates the spatial subtitle database in advance.

To this end, the server 100 for providing information on a product in content receives scene-specific spatial subtitles for content from the spatial subtitle creator terminal 400. Here, the scene-specific spatial subtitles are information indicating seller information (e.g., e-commerce information for selling a product and the like) of each broadcast derivative product (e.g., a chair, a bed, a piece of clothing, shoes, etc.) shown in scenes.

When a broadcast derivative product is touched by a user using content, the server 100 for providing information on a product in content extracts sales information (e.g., e-commerce information for selling a product and the like) of the broadcast derivative product on the basis of spatial subtitles received from the spatial subtitle creator terminal 400 and provides the extracted sales information to the content user terminal 300.

Time information corresponding to the scene-specific spatial subtitles is extracted on the basis of a subtitle file for the content. Here, the subtitle file for the content is text in accordance with the time information. Accordingly, the server 100 for providing information on a product in content can extract information on a time at which a subtitle corresponding to a scene is exposed on the basis of the subtitle file for the content.

Subsequently, the server 100 for providing information on a product in content generates a spatial subtitle database by mapping the time information to the spatial subtitles and storing the time information and the spatial subtitles.

As described above, the server 100 for providing information on a product in content generates a spatial subtitle database and thus can extract a spatial subtitle of a scene corresponding to time information.

After that, the server 100 for providing information on a product in content extracts sales information (e.g., e-commerce information for selling a product) of a broadcast derivative product corresponding to the location information of the broadcast derivative product to be searched for in the spatial subtitle of a scene corresponding to the time information and provides the extracted sales information to the content user terminal 300.

When purchase of the broadcast derivative product is completed by the content user, the server 100 for providing information on a product in content receives a purchase completion message from the e-commerce server 200.

After that, the server 100 for providing information on a product in content extracts a spatial subtitle creator who has registered the sales information of the broadcast derivative product from a spatial subtitle creator database and then pays some of a sales amount of the broadcast derivative product to an account of the spatial subtitle creator.

The server 100 for providing information on a product in content builds up the spatial subtitle creator database to pay, when a broadcast derivative product of a spatial subtitle created by a spatial subtitle creator is sold, some of the sales amount to the spatial subtitle creator as a commission as described above.

To this end, the server 100 for providing information on a product in content receives scene-specific spatial subtitles for content from the spatial subtitle creator terminal 400 and then extracts sales information of broadcast derivative products included in the scene-specific spatial subtitles for the content. Here, extracting the sales information of the broadcast derivative products is for the purpose of determining which broadcast derivative products correspond to the spatial subtitles created by a spatial subtitle creator.

Subsequently, the server 100 for providing information on a product in content builds up the spatial subtitle creator database by mapping the sales information of the broadcast derivative products to spatial subtitle creator information and storing the sales information and the spatial subtitle creator information.

Since the server 100 for providing information on a product in content builds up the spatial subtitle creator database as described above, when a broadcast derivative product of a spatial subtitle created by a spatial subtitle creator is sold later, some of the sales amount can be paid to the spatial subtitle creator as a commission.

Meanwhile, when a broadcast derivative product is touched in the content user terminal 300, the server 100 for providing information on a product in content receives a purchase request message for the broadcast derivative product from the content user terminal 300.

Then, the server 100 for providing information on a product in content provides the purchase request message for the broadcast derivative product to the e-commerce server 200 so that the content user can purchase the broadcast derivative product.

Subsequently, the server 100 for providing information on a product in content may receive a commission for the purchase of the broadcast derivative product from the e-commerce server 200.

The e-commerce server 200 is a shopping mall server for selling broadcast derivative products.

When the purchase of the broadcast derivative product is completed by the content user, the e-commerce server 200 provides the purchase completion message to the server 100 for providing information on a product in content. Accordingly, the server 100 for providing information on a product in content can pay some of the sales amount to the spatial subtitle creator.

Meanwhile, when the broadcast derivative product is touched on the content user terminal 300 and the purchase request message for the broadcast derivative product is received from the server 100 for providing information on a product in content, the e-commerce server 200 enables the content user to purchase the broadcast derivative product. When the purchase of the broadcast derivative product is completed by the content user, the e-commerce server 200 provides the purchase completion message to the server 100 for providing information on a product in content. Accordingly, the server 100 for providing information on a product in content can pay some of the sales amount to the spatial subtitle creator as a commission.

The content user terminal 300 is a terminal held by the user who uses content through the server 100 for providing information on a product in content. The content user terminal 300 can be implemented as a smartphone, a tablet personal computer (PC), etc.

The content user terminal 300 receives content from a video provision company terminal 500 and then provides a spatial subtitle request message for the content to the server 100 for providing information on a product in content. The content user terminal 300 receives spatial subtitles for the content from the server 100 for providing information on a product in content.

Subsequently, in a process of using the content through the content user terminal 300, the user touches a broadcast derivative product when he or she wants to know information on the broadcast derivative product in a specific scene of the content.

Then, the content user terminal 300 provides a product search request message including content information and location information and time information of the broadcast derivative product to the server 100 for providing information on a product in content.

Subsequently, the content user terminal 300 receives sales information (e.g., e-commerce information for selling a product and the like) of the broadcast derivative product from the server 100 for providing information on a product in content and then accesses the e-commerce server 200 using the sales information.

In the case of accessing the e-commerce server 200 and purchasing the broadcast derivative product, the content user terminal 300 receives a payment procedure for the broadcast derivative product from the e-commerce server 200. When a payment is completed through the payment procedure, the content user terminal 300 provides a payment completion message to the e-commerce server 200.

Meanwhile, when the broadcast derivative product is touched, the content user terminal 300 provides the purchase request message for the broadcast derivative product to the server 100 for providing information on a product in content. Accordingly, the server 100 for providing information on a product in content may provide the purchase request message for the broadcast derivative product to the e-commerce server 200 and then receive the commission for the purchase of the broadcast derivative product from the e-commerce server 200.

The spatial subtitle creator terminal 400 is a terminal held by a user who creates and then provides the scene-specific spatial subtitles for the content to the server 100 for providing information on a product in content. The spatial subtitle creator terminal 400 can be implemented as a smartphone, a tablet PC, etc.

According to an embodiment, the spatial subtitle creator terminal 400 creates spatial subtitles by matching products in the content to products sold in the e-commerce server 200.

When the content is received from the video provision company terminal 500, the spatial subtitle creator terminal 400 creates and then provides the scene-specific spatial subtitles to the server 100 for providing information on a product in content.

Figure 2:
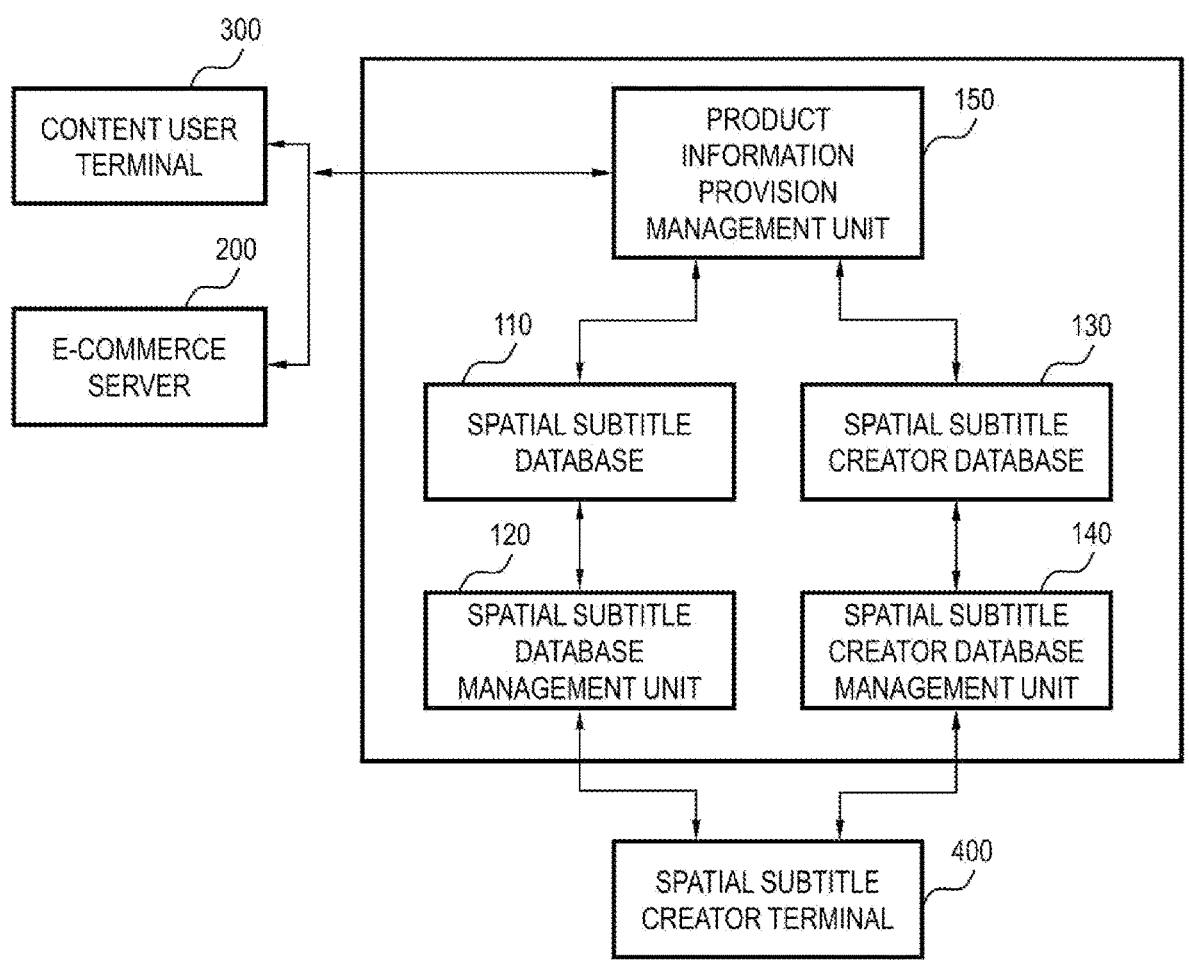
FIG. 2 is a block diagram illustrating an internal structure of a server for providing information on a product in content according to an embodiment of the present disclosure.

FIG. 2 is a block diagram illustrating an internal structure of a server for providing information on a product in content according to an embodiment of the present disclosure.

Referring to FIG. 2, the server 100 for providing information on a product in content includes a spatial subtitle database 110, a spatial subtitle database management unit 120, a spatial subtitle creator database 130, a spatial subtitle creator database management unit 140, and a product information provision management unit 150.

The spatial subtitle database management unit 120 receives scene-specific spatial subtitles for content from the spatial subtitle creator terminal 400. Here, scene-specific spatial subtitles are information indicating seller information (e.g., e-commerce information for selling a product and the like) of each broadcast derivative product (e.g., a chair, a bed, a piece of clothing, shoes, etc.) shown in scenes.

Subsequently, the spatial subtitle database management unit 120 extracts time information corresponding to scene-specific spatial subtitles on the basis of a subtitle file for the content. Here, the subtitle file for the content is text in accordance with the time information. Accordingly, the server 100 for providing information on a product in content can extract information on a time at which a subtitle corresponding to a scene is exposed on the basis of the subtitle file for the content.

Subsequently, the spatial subtitle database management unit 120 generates the spatial subtitle database 110 by mapping the time information to the spatial subtitles and storing the time information and the spatial subtitles.

As described above, the spatial subtitle database management unit 120 generates a spatial subtitle database and thus can extract a spatial subtitle of a scene corresponding to time information.

The spatial subtitle creator database management unit 140 receives scene-specific spatial subtitles for content from the spatial subtitle creator terminal 400 and then extracts sales information of broadcast derivative products included in the scene-specific spatial subtitles for the content. Here, extracting the sales information of the broadcast derivative products is for the purpose of determining which broadcast derivative products correspond to the spatial subtitles created by a spatial subtitle creator.

The spatial subtitle creator database management unit 140 builds up the spatial subtitle creator database 130 by mapping the sales information of the broadcast derivative products to spatial subtitle creator information and storing the broadcast derivative products with the spatial subtitle creator information.

Since the spatial subtitle creator database management unit 140 builds up the spatial subtitle creator database as described above, when a broadcast derivative product of a spatial subtitle created by a spatial subtitle creator is sold later, some of the sales amount can be paid to the spatial subtitle creator as a commission.

The product information provision management unit 150 receives a product search request message including content information and location information and time information of a broadcast derivative product from the content user terminal 300.

After that, the product information provision management unit 150 extracts sales information of the broadcast derivative product according to the product search request message and provides the extracted sales information to the content user terminal 300.

To this end, the product information provision management unit 150 extracts the content information and the location information and the time information of the broadcast derivative product from the product search request message. After that, the product information provision management unit 150 extracts a spatial subtitle of a scene corresponding to the time information from the spatial subtitle database 110. Here, the scene-specific spatial subtitle is information indicating product information of each broadcast derivative product (e.g., a chair, a bed, a piece of clothing, shoes, etc.) shown in the scene.

The product information provision management unit 150 extracts time information corresponding to the scene-specific spatial subtitle on the basis of the subtitle file for the content. Here, the subtitle file for the content is text in accordance with the time information. Accordingly, the server 100 for providing information on a product in content can extract information on a time at which a subtitle corresponding to the scene is exposed on the basis of the subtitle file for the content.

After that, the product information provision management unit 150 extracts the sales information (e.g., e-commerce information for selling a product or the like) of a broadcast derivative product corresponding to the location information of the broadcast derivative product to be searched for in the spatial subtitle of the scene corresponding to the time information and then provides an information on seller which sells the corresponding product to the content user terminal 300 on the basis of product information.

Figure 3:
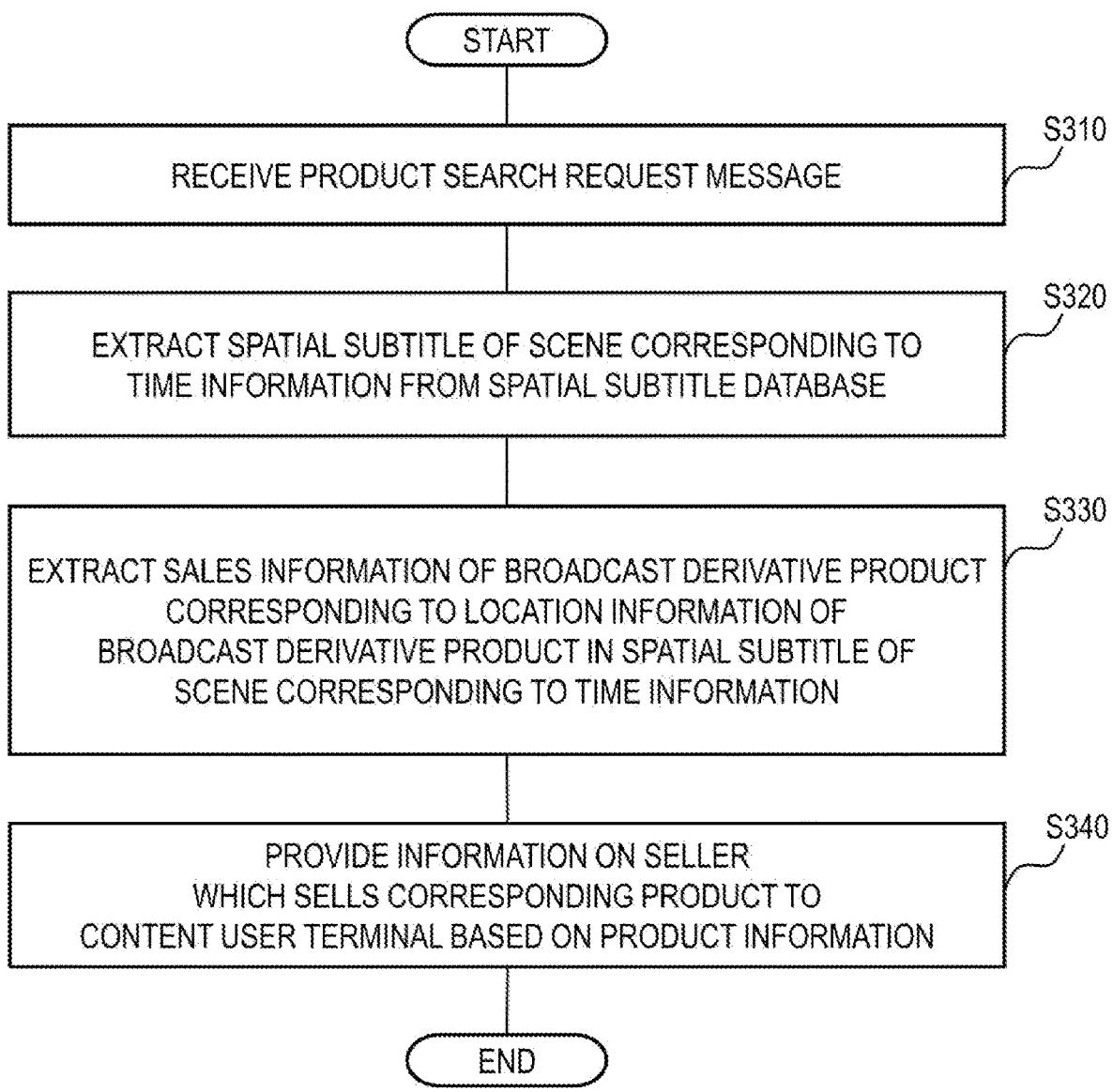
FIG. 3 is a flowchart illustrating a method of providing information on a product in content according to an embodiment of the present disclosure.

FIG. 3 is a flowchart illustrating a method of providing information on a product in content according to an embodiment of the present disclosure. In the embodiment of FIG. 3, a server for providing information on a product in content provides e-commerce information for selling a corresponding product according to a product search request from a content user.

Referring to FIG. 3, the server 100 for providing information on a product in content receives a product search request message including content information and location information and time information of a broadcast derivative product from the content user terminal 300 (operation S310).

The server 100 for providing information on a product in content extracts the content information and the location information and the time information of the broadcast derivative product from the product search request message (operation S320) and then extracts a spatial subtitle of a scene corresponding to the time information from a pre-built spatial subtitle database (operation S330). Here, the scene-specific spatial subtitle is information indicating product information of each broadcast derivative product (e.g., a chair, a bed, a piece of clothing, shoes, etc.) shown in the scene.

The server 100 for providing information on a product in content extracts sales information (e.g., e-commerce information for selling a product or the like) of a broadcast derivative product corresponding to the location information of the broadcast derivative product in the spatial subtitle of the scene corresponding to the time information (operation S330) and then provides an information on seller which sells the corresponding product to the content user terminal 300 on the basis of product information (operation S340).

Figure 4:
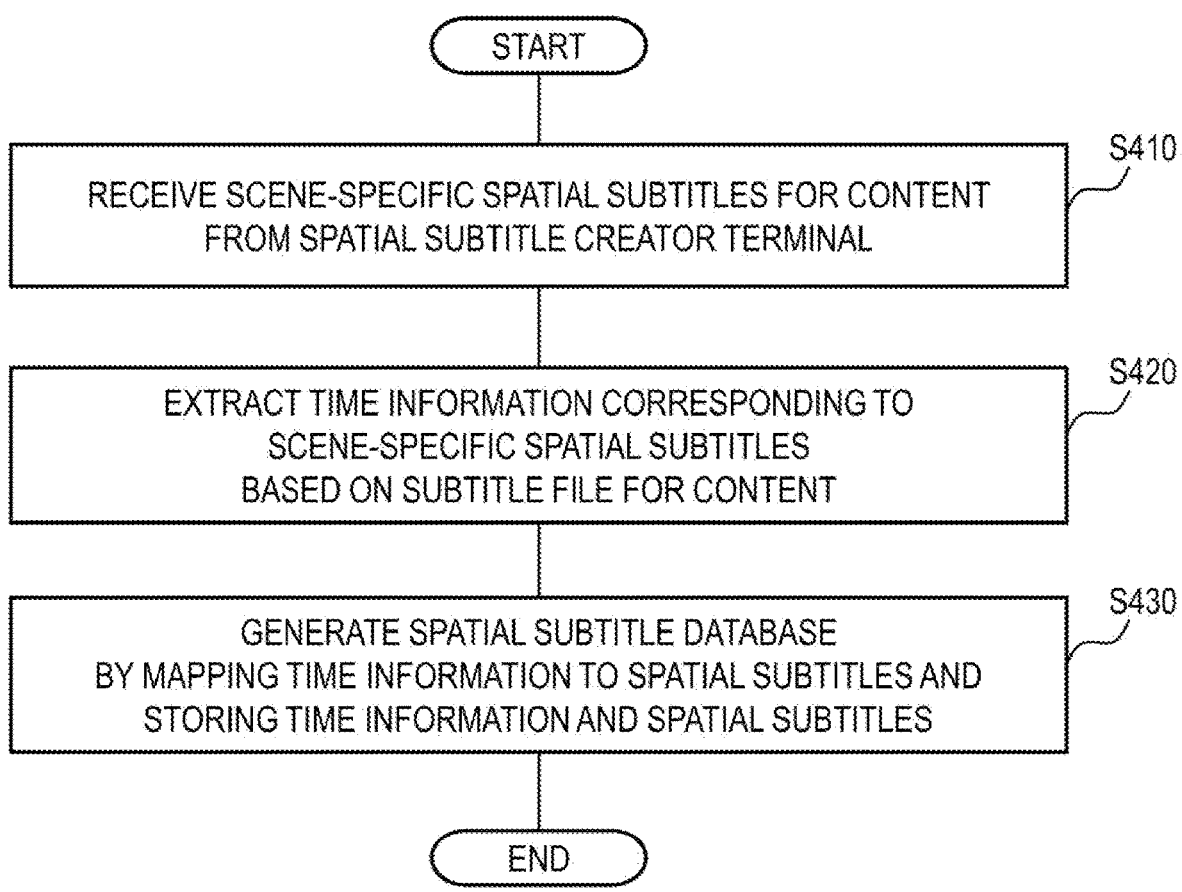
FIG. 4 is a flowchart illustrating a method of providing information on a product in content according to another embodiment of the present disclosure.

FIG. 4 is a flowchart illustrating a method of providing information on a product in content according to another embodiment of the present disclosure. In the embodiment of FIG. 4, a server for providing information on a product in content builds up a spatial subtitle database using scene-specific spatial subtitles created by a spatial subtitle creator.

Referring to FIG. 4, the server 100 for providing information on a product in content receives scene-specific spatial subtitles for content from the spatial subtitle creator terminal 400 (operation S410). Here, the scene-specific spatial subtitles are information indicating seller information (e.g., e-commerce information for selling a product and the like) of each broadcast derivative product (e.g., a chair, a bed, a piece of clothing, shoes, etc.) shown in scenes.

The server 100 for providing information on a product in content extracts time information corresponding to the scene-specific spatial subtitle on the basis of a subtitle file for the content (operation S420). Here, the subtitle file for the content is text in accordance with the time information. Accordingly, the server 100 for providing information on a product in content can extract information on a time at which a subtitle corresponding to the scene is exposed on the basis of the subtitle file for the content.

Subsequently, the server 100 for providing information on a product in content generates a spatial subtitle database by mapping the time information to the spatial subtitles and storing the time information and the spatial subtitles (operation S430).

Figure 5:
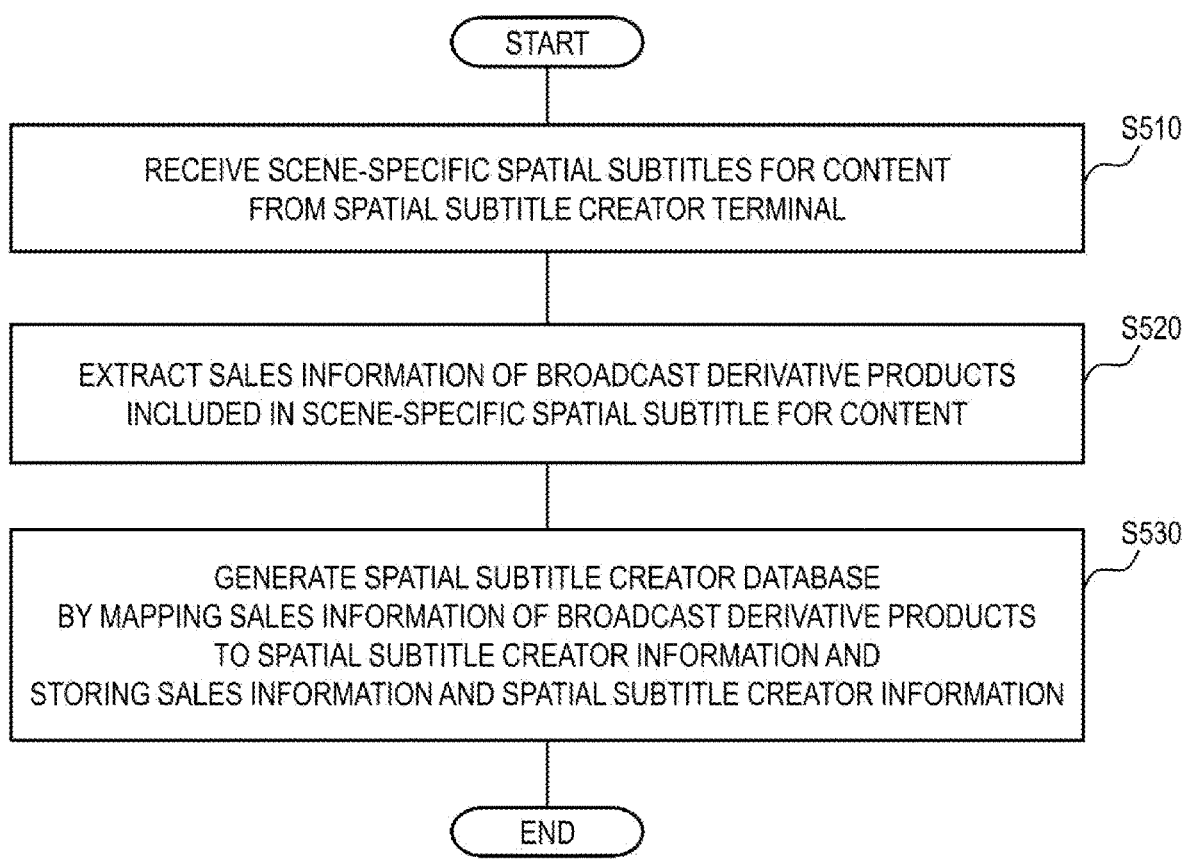
FIG. 5 is a flowchart illustrating a method of providing information on a product in content according to still another embodiment of the present disclosure.

FIG. 5 is a flowchart illustrating a method of providing information on a product in content according to still another embodiment of the present disclosure. In the embodiment of FIG. 5, a server for providing information on a product in content builds up a spatial subtitle creator database using scene-specific spatial subtitles created by a spatial subtitle creator.

Referring to FIG. 5, the server 100 for providing information on a product in content receives scene-specific spatial subtitles for content from the spatial subtitle creator terminal 400 (operation S510). The server 100 for providing information on a product in content extracts sales information of broadcast derivative products included in the scene-specific spatial subtitles for the content (operation S520). Here, extracting the sales information of the broadcast derivative products is for the purpose of determining which broadcast derivative products correspond to the spatial subtitles created by a spatial subtitle creator.

The server 100 for providing information on a product in content builds up a spatial subtitle creator database by mapping the sales information of the broadcast derivative products to spatial subtitle creator information and storing the sales information and the spatial subtitle creator information (operation S530).

Since the server 100 for providing information on a product in content builds up the spatial subtitle creator database as described above, when a broadcast derivative product of a spatial subtitle created by a spatial subtitle creator is sold later, some of the sales amount can be paid to the spatial subtitle creator as a commission.

Figure 6:
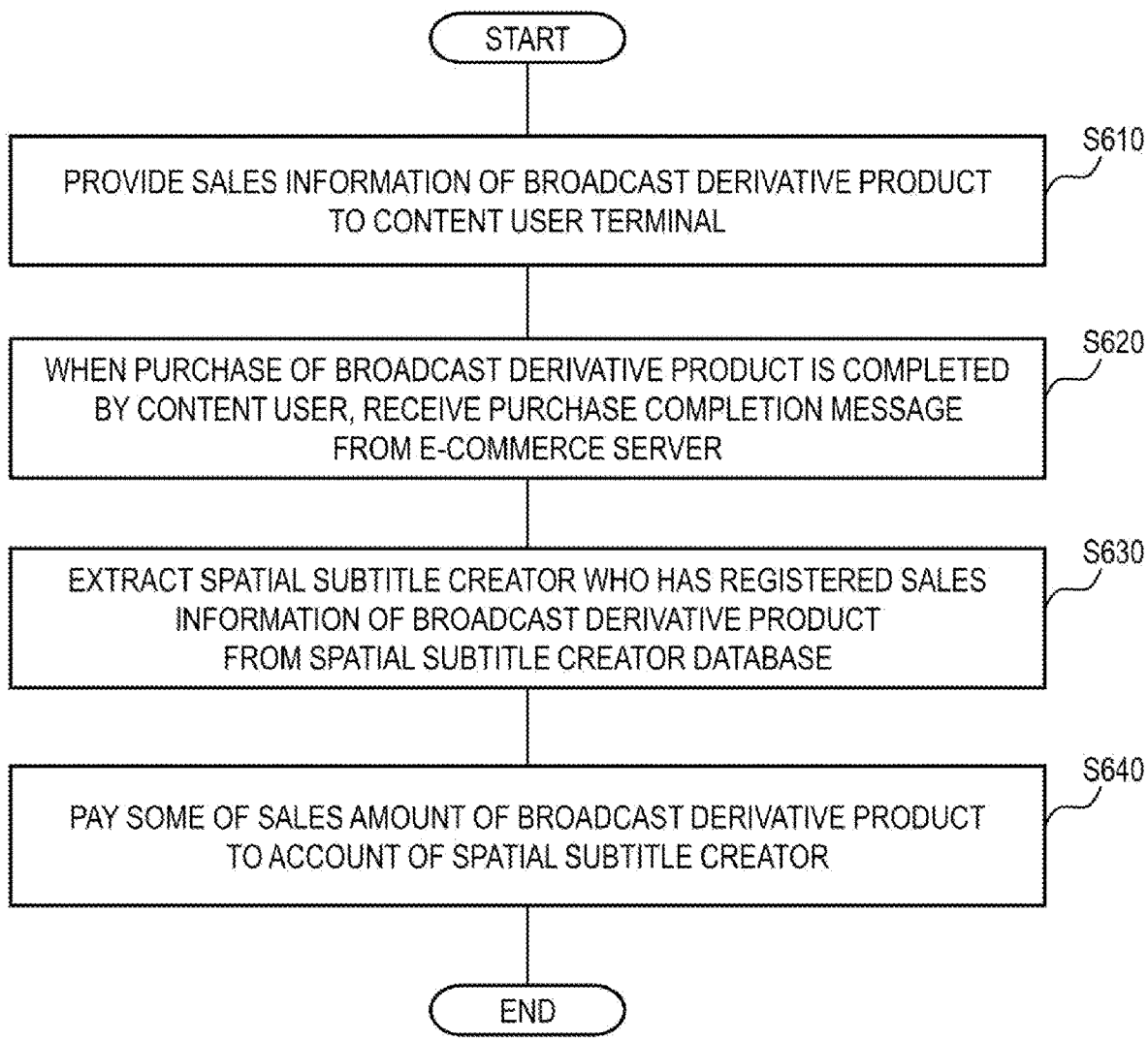
FIG. 6 is a flowchart illustrating a method of providing information on a product in content according to yet another embodiment of the present disclosure.

FIG. 6 is a flowchart illustrating a method of providing information on a product in content according to yet another embodiment of the present disclosure. In the embodiment of FIG. 6, when a broadcast derivative product is sold through a spatial subtitle, some of the sales amount may be paid to a spatial subtitle creator as a commission.

Referring to FIG. 6, the server 100 for providing information on a product in content provides sales information of a broadcast derivative product requested by the content user terminal 300 to the content user terminal 300 (operation S610).

When purchase of the broadcast derivative product is completed by the content user, the server 100 for providing information on a product in content receives a purchase completion message from the e-commerce server 200 (operation S620).

The server 100 for providing information on a product in content extracts a spatial subtitle creator who has registered sales information of the broadcast derivative product from a spatial subtitle creator database (operation S630) and then pays some of the sales amount of the broadcast derivative product to an account of the spatial subtitle creator (operation S640).

Although the present disclosure has been described with reference to limited embodiments and drawings, the present disclosure is not limited to the embodiments, and various alterations and modifications can be made by those of ordinary skill in the art to which the present disclosure pertains. Therefore, the spirit of the present disclosure should be determined by only the following claims, and all equivalents or equivalent modifications thereof fall within the scope of the present disclosure.

The invention claimed is:

1. A method of providing information on a product in content which is performed by a server for providing the information on the product in the content, the method comprising:

obtaining scene-specific spatial subtitles for scenes of the content, wherein the scene-specific spatial subtitles include seller information of each of broadcast derivative products in the scenes;

extracting a plurality of pieces of time information corresponding to the scene-specific spatial subtitles from a subtitle file for the content;
generating a spatial subtitle database by mapping the plurality of pieces of time information to the scene-specific spatial subtitles;
providing the content to a content user terminal;
based on a user selecting a broadcast derivative product displayed on a display of the content user terminal, receiving a product search request message from the content user terminal;
extracting content information and location information and time information of the broadcast derivative product from the product search request message received from the content user terminal;
extracting a spatial subtitle of a scene corresponding to the time information from the scene-specific spatial subtitles in the spatial subtitle database;
extracting sales information of the broadcast derivative product corresponding to the location information in the spatial subtitle of the scene corresponding to the time information and providing the extracted sales information to the content user terminal;
when purchase of the broadcast derivative product is completed through the sales information of the broadcast derivative product, extracting information of a spatial subtitle creator who has registered the spatial subtitle of the scene from a spatial subtitle creator database; and
paying some of a sales amount of the broadcast derivative product to an account of the spatial subtitle creator,
wherein the method further comprises:
generating the spatial subtitle creator database by matching spatial subtitle creator information to sales information of the broadcast derivative products in the scenes acquired by analyzing the scene-specific spatial subtitles for the content.

2. A server for providing information on a product in content, the server comprising:
a spatial subtitle database management unit configured to generate, when scene-specific spatial subtitles for scenes of the content are obtained, a spatial subtitle database by mapping the scene-specific spatial subtitles to a plurality of pieces of time information acquired by analyzing the scene-specific spatial subtitles for the content;
a spatial subtitle creator database management unit configured to obtain the scene-specific spatial subtitles for the content and generate a spatial subtitle creator database by matching spatial subtitle creator information to sales information of broadcast derivative products in the scenes acquired by analyzing the scene-specific spatial subtitles for the content; and
a product information provision management unit configured to:
provide the content to a content user terminal,
based on a user selecting a broadcast derivative product displayed on a display of the content user terminal, receive a product search request message from the content user terminal,
extract content information and location information and time information of the broadcast derivative product from the product search request message received from the content user terminal,
extract a spatial subtitle of a scene corresponding to the time information from the scene-specific spatial subtitles in the spatial subtitle database,
extract sales information of the broadcast derivative product corresponding to the location information in the spatial subtitle of the scene corresponding to the time information and provide the extracted sales information to the content user terminal, extract information of a spatial subtitle creator who has registered the spatial subtitle of the scene from the spatial subtitle creator database when purchase of the broadcast derivative product is completed through the sales information of the broadcast derivative product, and
pay some of a sales amount of the broadcast derivative product to an account of the spatial subtitle creator.

* * * * *